(12) United States Patent
Ollo Odriozola et al.

(10) Patent No.: US 8,348,544 B2
(45) Date of Patent: Jan. 8, 2013

(54) CONNECTING DEVICE FOR USE BETWEEN A FORMWORK GIRDER AND A BRACE

(75) Inventors: Ander Ollo Odriozola, Guipuzcoa (ES); Iban Lizarralde Aramburu, Guipuzcoa (ES)

(73) Assignee: Ulma C Y E, S. Coop., Onati (ES)

( * ) Notice: Subject to any disclaimer, the term of this patent is extended or adjusted under 35 U.S.C. 154(b) by 647 days.

(21) Appl. No.: 12/373,664

(22) PCT Filed: Jan. 10, 2007

(86) PCT No.: PCT/ES2007/000007
§ 371 (c)(1),
(2), (4) Date: Oct. 12, 2009

(87) PCT Pub. No.: WO2008/006916
PCT Pub. Date: Jan. 17, 2008

(65) Prior Publication Data
US 2010/0207010 A1  Aug. 19, 2010

(30) Foreign Application Priority Data
Jul. 14, 2006   (ES) .................................. 200601888

(51) Int. Cl.
*E04G 7/14* (2006.01)
(52) U.S. Cl. ...... 403/385; 403/389; 403/396; 428/228.1
(58) Field of Classification Search .................. 403/385, 403/387, 389, 396, 400, 338; 52/719, 655; 248/228.1, 228.5, 229.24, 231.61
See application file for complete search history.

(56) References Cited

U.S. PATENT DOCUMENTS

| | | | | | |
|---|---|---|---|---|---|
| 1,408,301 | A | * | 2/1922 | Jeter ........................... | 249/219.1 |
| 1,749,476 | A | * | 3/1930 | Fillmore ........................ | 72/458 |
| 1,784,448 | A | * | 12/1930 | Kahn ............................ | 249/211 |
| 2,218,819 | A | * | 10/1940 | Bror Hillberg ................ | 249/23 |
| 2,398,306 | A | * | 4/1946 | Hermanson ................... | 403/385 |
| 3,059,884 | A | * | 10/1962 | Stanfill ........................ | 248/68.1 |
| 4,541,155 | A | * | 9/1985 | Gagnon ........................ | 24/486 |
| 5,104,079 | A | * | 4/1992 | Hardtke ....................... | 248/228.5 |
| 6,125,604 | A | * | 10/2000 | Holmes ........................ | 52/713 |

(Continued)

FOREIGN PATENT DOCUMENTS

DE  25 57 241   6/1977
(Continued)

*Primary Examiner* — Daniel P. Stodola
*Assistant Examiner* — Jonathan Masinick
(74) *Attorney, Agent, or Firm* — Knobbe Martens Olson & Bear LLP

(57) ABSTRACT

The invention relates to a connecting device for the connection between a brace and a formwork girder. The device incorporates respective arms (3) which terminate at one of their ends in hooks (4) which can be coupled on a first flange of the brace (1) and has flat extensions (6) extending from tubular portions (5) intended to rest on a lower projection of the formwork girder (2). It also has parallel rods (7) located with an inclination opposite to that of the arms (3) traversing the tubular portions (5), which are linked by a connecting bridge (9) traversed by a screw (10), the adjustment of which determines the movement of a clamp (11) assembled on the rods (7). The clamp is provided with locking means (12) which can be coupled to a second flange of the brace (1), opposite the first, in order to secure the connection between the brace (1) and the formwork girder (2).

3 Claims, 3 Drawing Sheets

U.S. PATENT DOCUMENTS

2002/0127054 A1   9/2002   Schworer

FOREIGN PATENT DOCUMENTS

| | | |
|---|---|---|
| DE | 80 09 687 | 7/1980 |
| DE | 31 48 217 | 6/1983 |
| DE | 32 31 220 | 2/1984 |
| DE | 35 11 335 | 10/1986 |
| EP | 547356 A1 * | 6/1993 |
| EP | 1 544 379 | 6/2005 |
| ES | 2 184 581 | 4/2003 |
| ES | 1 061 027 | 12/2005 |
| JP | 05106342 A * | 4/1993 |

* cited by examiner

CONNECTING DEVICE FOR USE BETWEEN A FORMWORK GIRDER AND A BRACE

OBJECT OF THE INVENTION

The present invention belongs to field of construction and is especially applicable to establish the anchoring connection between a brace and a formwork girder perpendicular to the former.

The object of the invention consists of a connecting device securely establishing the coupling between the brace and the formwork girder, such that the connection is reinforced and a comfortable handling of the fastening means is ensured.

BACKGROUND OF THE INVENTION

A support structure is usually used in horizontal (floor and slab) and vertical (wall, stack and pillar) formworks which is formed by braces on which formwork girders having a web of wood or made completely of wood are placed transversely, on which girders the formwork boards are nailed for the subsequent pouring of concrete.

The braces are normally usually U-shaped girders which are opposite at their base, whereas the formwork girders are double T-shaped girders made integrally of wood or metal girders with their upper base lightened, defining a channel in which a core of wood is housed.

Devices such as those described in patents DE 32 31 220 and DE 100 33 425 are used for the connection between the brace and the formwork girder.

Patent DE 32 31 220 describes an anchoring device consisting of two arms in a parallel arrangement provided at one of their ends with hooks intended to be coupled in one of the flanges of the brace and at their other end they have boreholes for the passage of corresponding parallel flanges of a U-shaped structure, the transverse branch of which is coupled below the other flange of the brace.

The arms have flat expansions resting on the base of the formwork girders. To achieve the connection between braces and formwork girders the rods are finished in respective threaded studs in which nuts are screwed, which nuts push the arms on the base of the formwork girders, establishing in turn the anchoring of the U-shaped structure on the brace.

Patent DE 100 33 425 in turn also relates to an anchoring device consisting of an arm coupled on the flange of the brace by means of a hook and resting on the formwork girder by means of a flat expansion, also having a rod which is doubly bent at one end to embrace the flange of the brace and the formwork girder, and which terminates at its other end in a stud which is introduced in a borehole defined in the arm to which it is fixed by means of a nut, establishing the anchoring position.

Utility model ES 1 061 027 belonging to the same proprietor of the present invention proposes a connecting device incorporating respective arms provided with hooks at one of their ends for their coupling to one of the flanges of the brace, and at their other end they have flat extensions resting on the base of the formwork girder. The connecting device additionally incorporates rods, one of the ends of which is housed in respective tubular portions provided in the arms. These rods extend, after respective bends, in transverse branches embracing another opposite flange of the brace and meeting in a centered nut in which a screw is screwed, the tip of which impinges against this flange of the brace, thus establishing the fixing of the connecting device.

In this case, the tightening in the connection is achieved by means of the screw acting directly against the brace. However, the pressure of the screw against the brace determines that a spring effect which can tend to loosen the connection occurs in the rod forming the closure, this circumstance is especially problematic in the case of girders useful for raising the formwork once it has been assembled, in which the connection must be very solid.

DESCRIPTION OF THE INVENTION

The connecting device for the connection between a brace and a formwork girder proposed by this invention satisfactorily solves the problems set forth above by means of incorporating a structure reinforcing the connection and preventing a spring effect which can weaken the fixing between a brace and a formwork girder from occurring.

This connecting device is applicable for its use with formwork girders with a specific geometry, with a double T shape, designed integrally in wood.

The connecting device has respective arms which terminate at one of their ends in hooks coupled on one of the flanges of the brace and at their opposite ends they have flat extensions extending internally from corresponding tubular portions, which extensions rest on the base of the formwork girders. There are parallel rods traversing the tubular portions and with an inclination opposite to that of the arms, which rods terminate at one of their ends in stops preventing the rods from being unlinked from the arms and have their other ends connected by means of a connecting branch or bridge.

The connecting bridge is traversed at its mid-point by a screw which is screwed thereon and the free end of which or tip of the screw impinges against a clamp assembled and guided on the rods with movement capacity, which clamp has locking means adapted to be fitted on the flange of the brace located in an arrangement opposite to the flange on which the hooks are coupled.

The fact of incorporating the clamp facilitates that, unlike other solutions, the screw does not act directly against the brace but rather against said clamp, thus preventing the spring effect which occurred with the rods.

The connecting device is adapted to the brace and to the formwork girder as follows, the hooks of the arms are coupled to a flange of the brace, the flat extensions rest on the formwork girder and the locking means are located opposite a flange of the brace which is opposite the former. The screw is then turned to move the clamp and therefore its locking means closer to the mentioned opposite flange on which they are fitted, thus establishing a secure connection between a brace and a formwork girder.

The clamp is preferably configured by a central body terminated at its ends in respective bushings moving guided on the rods and from which corresponding plates provided with the locking means extend, which means can consist of respective tabs between which the flange of the brace is fitted.

DESCRIPTION OF THE DRAWINGS

To complement the description which is being made and with the aim of aiding to better understand the features of the invention according to a preferred practical embodiment thereof, a set of drawings is attached as an integral part of said description, in which the following has been shown with an illustrative and non-limiting character.

PREFERRED EMBODIMENT OF THE INVENTION

In view of the figures an embodiment of the connecting device for the connection between a brace (1) and a formwork girder (2) is described below.

Figure 3:
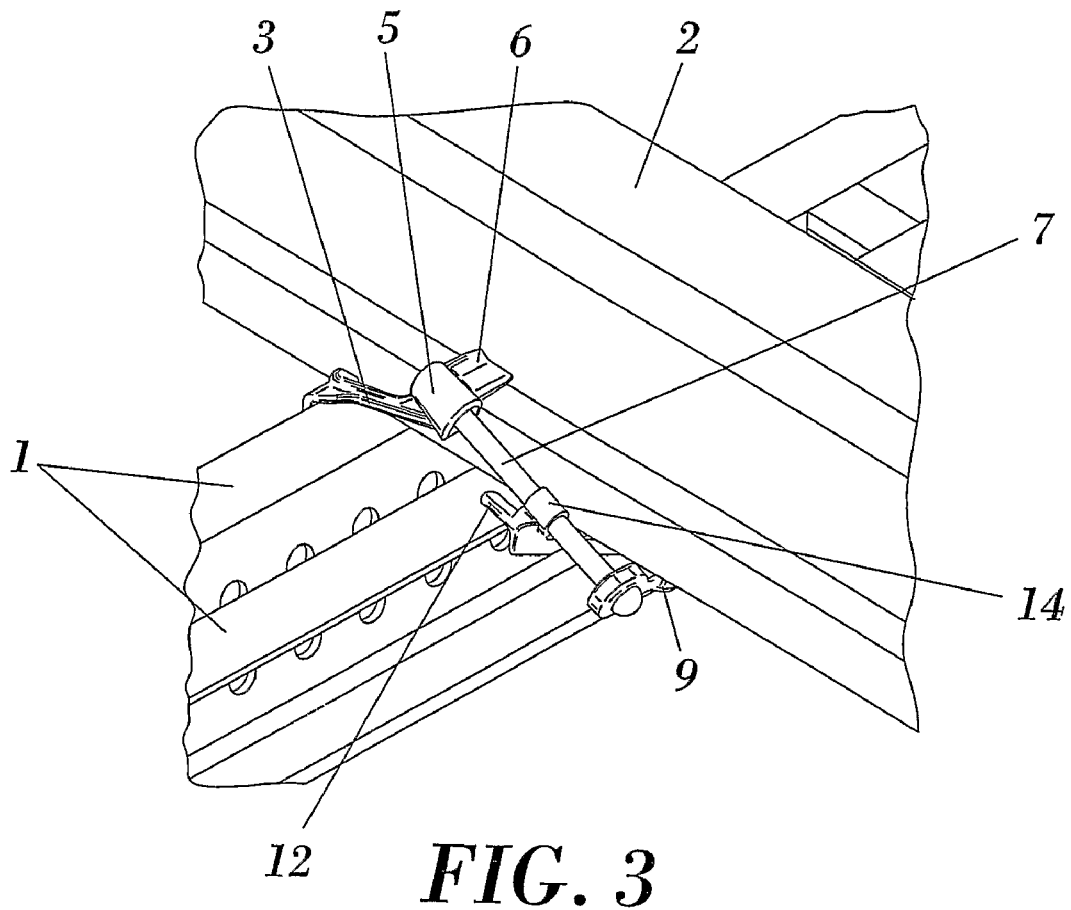
FIG. 3 shows a perspective view in which it is observed how the connecting device established the link between the brace and the formwork girder.

FIG. 3 shows the brace (1) and the formwork girder (2) located in an arrangement perpendicular to the former, as well as part of the device establishing the connection between both.

Figure 1:
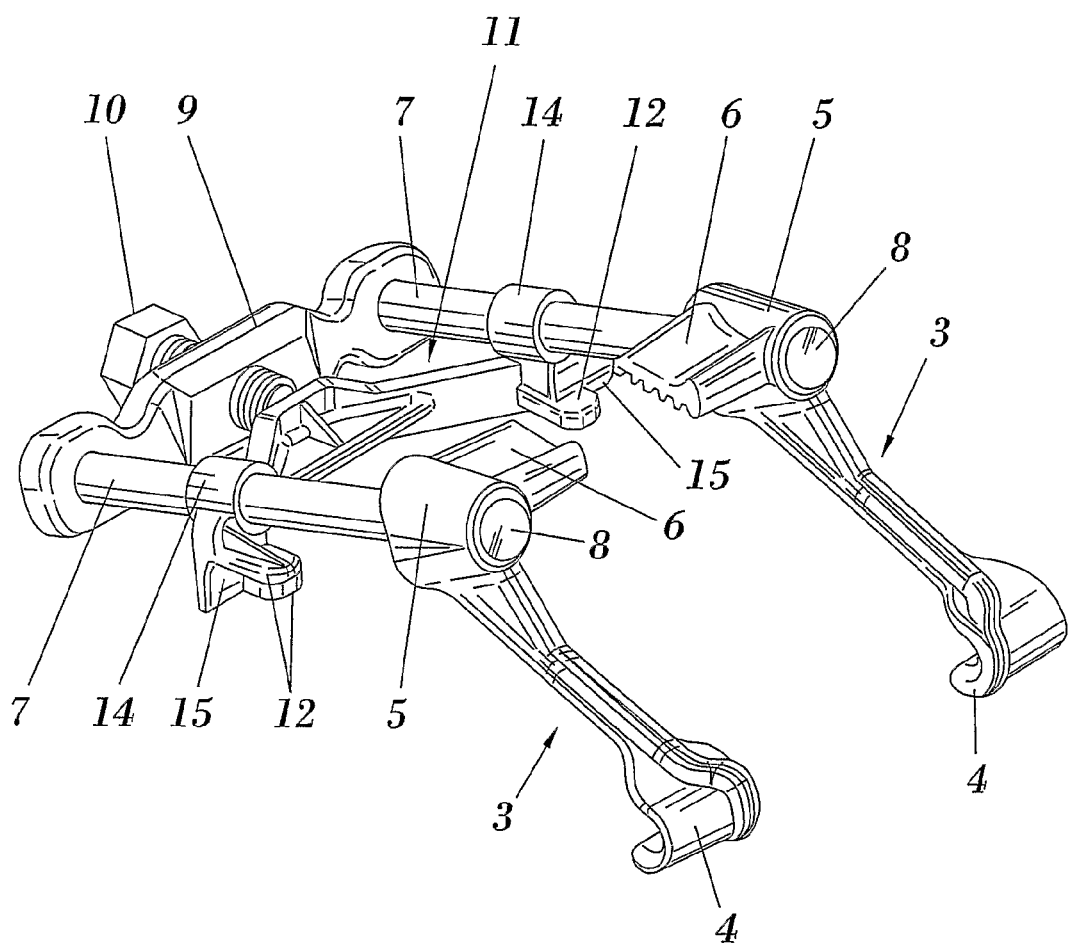
FIG. 1 shows a perspective view of the connecting device for the connection between a brace and a formwork girder.
Figure 2:
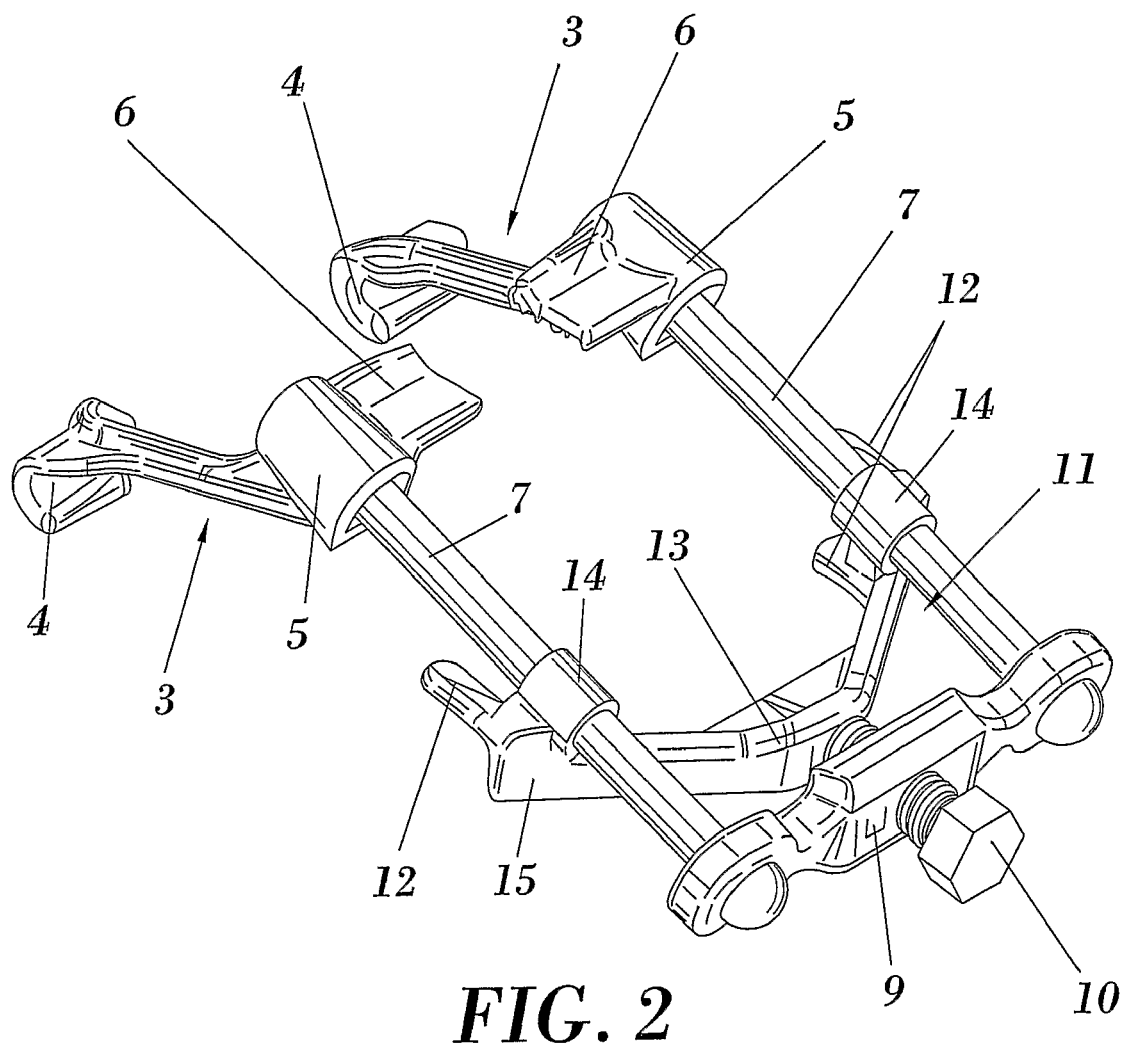
FIG. 2 shows another perspective view of the connecting device.

FIGS. 1 and 2 show the configuration of the connecting device, depicted in different perspectives, in which it is generally observed that the device has respective arms (3) which terminate at one of their ends in hooks (4) which can be coupled on a first flange of the brace (1) and at their opposite end they have tubular portions (5) from which respective internally opposite flat extensions (6) extend intended to rest on a lower projection of the formwork girder (2), as observed in FIG. 3.

The connecting device also has parallel rods (7), located with an inclination opposite to that of the arms (3), traversing the tubular portions (5) and which are provided at one of their ends with stops (8) preventing the rods (7) from being unlinked from the arms (3) and have their opposite ends linked by a connecting bridge (9) traversed by a screw (10).

Figure 4:
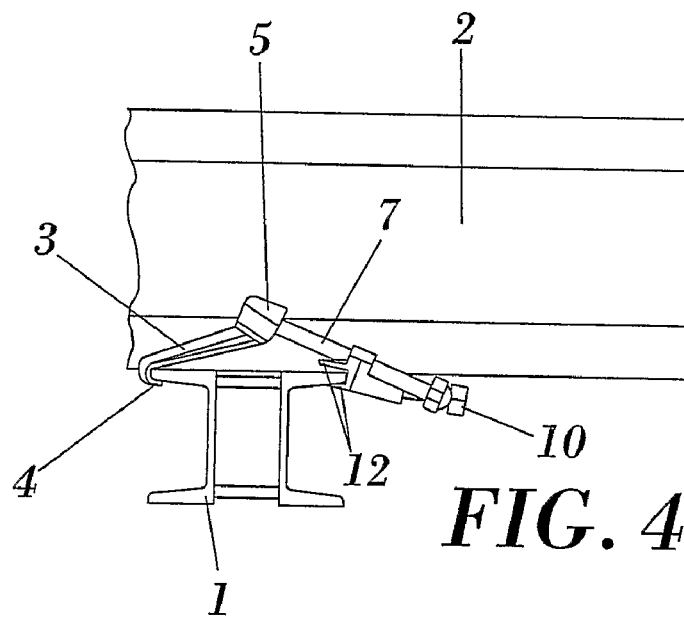
FIG. 4 shows a side view of the connecting device for the situation described in the previous figure.

In these same FIGS. 1 and 2 it can be observed that the connecting device additionally incorporates a clamp (11) assembled on the rods (7) with guided movement capacity, which is faced up to the screw (10) and which is provided with locking means (12) which can be coupled in a second flange of the brace (1), opposite to the first flange, by the push caused by the screw (10) on the clamp (11), the connection between the brace (1) and the formwork girder (2) thus being secured, as can be observed in FIG. 4.

In the embodiment shown in FIGS. 1 and 2 for example, the clamp (11) is configured by means of a central body (13), the ends of which terminate in corresponding bushings (14) assembled on the rods (7), from each of which corresponding plates (15) in which the locking means (12) are located extend, which means consist preferably of respective distant tabs (12) between which the second flange of the brace (1) is fitted.

In the situation shown in FIG. 3, it can be observed how the link between the brace (1) and the formwork girder (2) located perpendicularly to the former, with the hooks (4) of the arms (3) coupled in the first flange of the brace (1), the locking means (12) of the clamp (11) coupled in the second flange of the brace (1) and the flat extensions (6) of the arms (3) resting on a projection of the formwork girder (2). In this situation, the tightening in the connection between a brace (1) and a formwork girder (2) is established by means of adjusting the screw (10) which acts by pushing or releasing the clamp (11).

The invention claimed is:

1. A connecting device for the connection between a brace and a formwork girder, located perpendicularly to the former, wherein the formwork girder has a double T shape and is integrally formed in wood, comprising:
respective arms which terminate at one of their ends in hooks which can be coupled on a first flange of the brace, said arms having at ends opposite said hooks, tubular portions from which respective internally opposite flat extensions extend intended to rest on a lower projection of the formwork girder, and
parallel rods inserted into the tubular portions, said parallel rods, said tubular portions and said arms each having a longitudinal axis aligned in the same plane, such that said parallel rods form a fixed inclination with respect to the arms, and which are linked by a connecting bridge traversed by a screw, wherein a tip of said screw impinges against a clamp assembled on the rods with guided movement capacity, and which is provided with locking means which can be coupled in a second flange of the brace, opposite to the first flange, by the push caused by the screw on the clamp in order to secure the connection between the brace and the formwork girder.

2. The connecting device of claim 1, wherein the clamp is configured by means of a central body, the ends of which terminate in corresponding bushings assembled on the rods, from each of which corresponding plates in which the locking means are located extend.

3. The connecting device of any of claim 1 or 2, characterized in that the locking means consist of respective distant tabs between which the second flange of the brace is fitted.

* * * * *